(No Model.)
P. A. GORDON.
COMBINED PAN AND STOVE COVER LIFTER.
No. 344,524. Patented June 29, 1886.
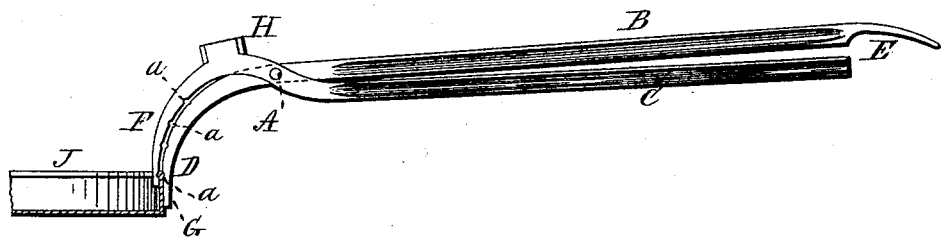
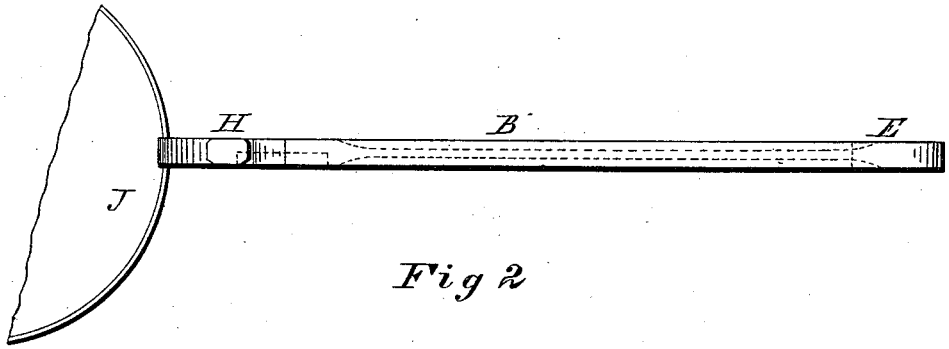
WITNESSES
J. H. Burridge
F. N. Perkins
INVENTOR
P. A. Gordon,
W. H. Burridge
Atty

UNITED STATES PATENT OFFICE.

PERKINS A. GORDON, OF MILAN, OHIO.

COMBINED PAN AND STOVE-COVER LIFTER.

SPECIFICATION forming part of Letters Patent No. 344,524, dated June 29, 1886.

Application filed May 21, 1885. Serial No. 166,252. (No model.)

*To all whom it may concern:*

Be it known that I, PERKINS A. GORDON, of Milan, in the county of Erie and State of Ohio, have invented new and useful Improvements in a Combined Pan and Stove-Cover Lifter; and I do hereby declare that the following is a full and complete description thereof.

The combined pan and stove-cover lifter above alluded to is intended more particularly for removing baking-pans and dishes from the oven and whereby they can be held in a horizontal position while being conveyed therefrom to the table.

The implement for the above-specified purpose consists of a pair of nippers provided with long slender handles for moving the jaws. Said jaws are preferably curved, but may have a right-angled relation to the handles; also, the jaws are of unequal lengths and have on their gripping-surface grooves adapting them to hold firmly the edge of a pan to which they may be applied.

A further and more full description of the implement will be found in the following specification, and shown in the accompanying drawings, making a part thereof, in which—

Figure 1 represents a side view of the implement as applied to a pan or dish. Fig. 2 is a top view of the same.

Like letters of reference denote like parts in the views.

The above-mentioned implement consists of two sections pivoted to each other at A, and of which B and C are the handles. One end of the handle B terminates in a jaw, D, having transversely in the upper side thereof grooves $a$, as seen in Fig. 1. The opposite end of said handle is a flat thin point, E, projecting beyond the end of the handle C. One end of the handle C also terminates in a jaw, F, adapted to close upon the jaw D, and in like manner is provided with transverse grooves corresponding to the grooves in the jaw D, and contiguous therewith when the jaws are closed.

It will be observed that the jaw D is much longer than the jaw F, thereby forming a terminal lip, G, beyond the end of the jaw F, as seen in Fig. 1.

On the top of the jaw F is a block, H, the use of which will presently be shown.

The practical use of the above-described implement is as follows: In Fig. 1, J represents a portion of an ordinary metal baking-pan, which, for illustration, is supposed to be in a heated condition, and either on a stove or in the oven, that the pan may be removed without applying the hands to it and at the same time be retained in a horizontal position to prevent spilling its contents. The nippers are used by gripping the side or edge of the pan, as seen in Fig. 1, in which it will be seen that the end of the short jaw F is on the inside of the pan and the longer jaw on the outside, with its extension or lip G farther down along the side of the pan. It will be noticed that the wire-beaded edge of the pan is clamped in the grooves of the jaws, so that on lifting the pan it cannot slip from between the jaws on being lifted thereby, and at the same time the pan is retained in a horizontal position by the lip G, against which the lower part of the side of the pan or dish will rest, the lip forming a brace and support to keep the pan level, that the contents may not fall out while being taken from the oven or from off the stove.

It will be apparent that in using the nippers a person can reach into an oven and pull the pan therefrom without danger of burning the hands, and carry the same to the table or elsewhere with safety.

The end E above referred to is the stove-cover lifter, and for that purpose is used as are stove-cover lifters in ordinary use.

The block H alluded to may be used as a hammer for driving tacks and other like purposes.

What I claim as my invention, and desire to secure by Letters Patent, is—

A combined pan and stove-cover lifter, consisting of the pivoted handles B and C, the upper one having a projecting jaw at the lower end and a flat projecting lip at the other end, both jaws being provided with corresponding grooves, $a\ a$, all substantially as and for the purpose described.

In testimony whereof I affix my signature in presence of two witnesses.

PERKINS A. GORDON.

Witnesses:
J. H. BURRIDGE,
G. J. HARDWAY.